US Patent [19] 3,938,624
Maynard                              [45] Feb. 17, 1976

[54] TRANSPORTATION SYSTEM WITH MOTOR FIELD CONTROL

[75] Inventor: John T. Maynard, New Berlin, Wis.
[73] Assignee: Armor Elevator Company, Inc., Louisville, Ky.
[22] Filed: May 10, 1974
[21] Appl. No.: 468,864

[52] U.S. Cl. ............................. 187/29 R; 318/338
[51] Int. Cl.² ........................................... H02P 5/16
[58] Field of Search ....... 187/29; 318/338, 350, 359

[56] References Cited
UNITED STATES PATENTS

| | | |
|---|---|---|
| 3,518,518 | 6/1970 | Ford, Jr. et al ................. 318/350 X |
| 3,611,098 | 10/1971 | Fair et al. ............................ 318/338 |
| 3,811,079 | 5/1974 | Tashiro et al. ...................... 318/338 |

Primary Examiner—Robert K. Schaefer
Assistant Examiner—W. E. Duncanson, Jr.
Attorney, Agent, or Firm—Andrus, Sceales, Starke & Sawall

[57] ABSTRACT

A first solid-state static converter receives a three-phase A.C. input and directly supplies direct current to a D.C. motor armature circuit to operate a traction sheave and control the movement of an elevator car in response to an error signal derived by the summation of a speed signal from a tachometer and a vehicle speed command signal while a second solid-state static converter receives a three-phase A.C. input and directly supplies direct current to a field circuit of the D.C. motor in response to the operation of a field gating control circuit. Three gating channels corresponding to the three source phases provide summing circuits receiving alternating phase reference signals through lead-lag filtering circuits, disable signals responsive to the source phases through lag filtering circuits, constant reference signals for continually providing sixty electrical degrees of conduction of the controlled rectifiers during each source cycle and providing a predetermined field current, and a field energy command signal supplied from a second summing circuit. A command signal supplied by the system supervisory control, a field current indicative feedback signal and an armature current indicative signal are directly summed at the second summing circuit to provide the field energy command signal to the first summing circuit.

20 Claims, 11 Drawing Figures

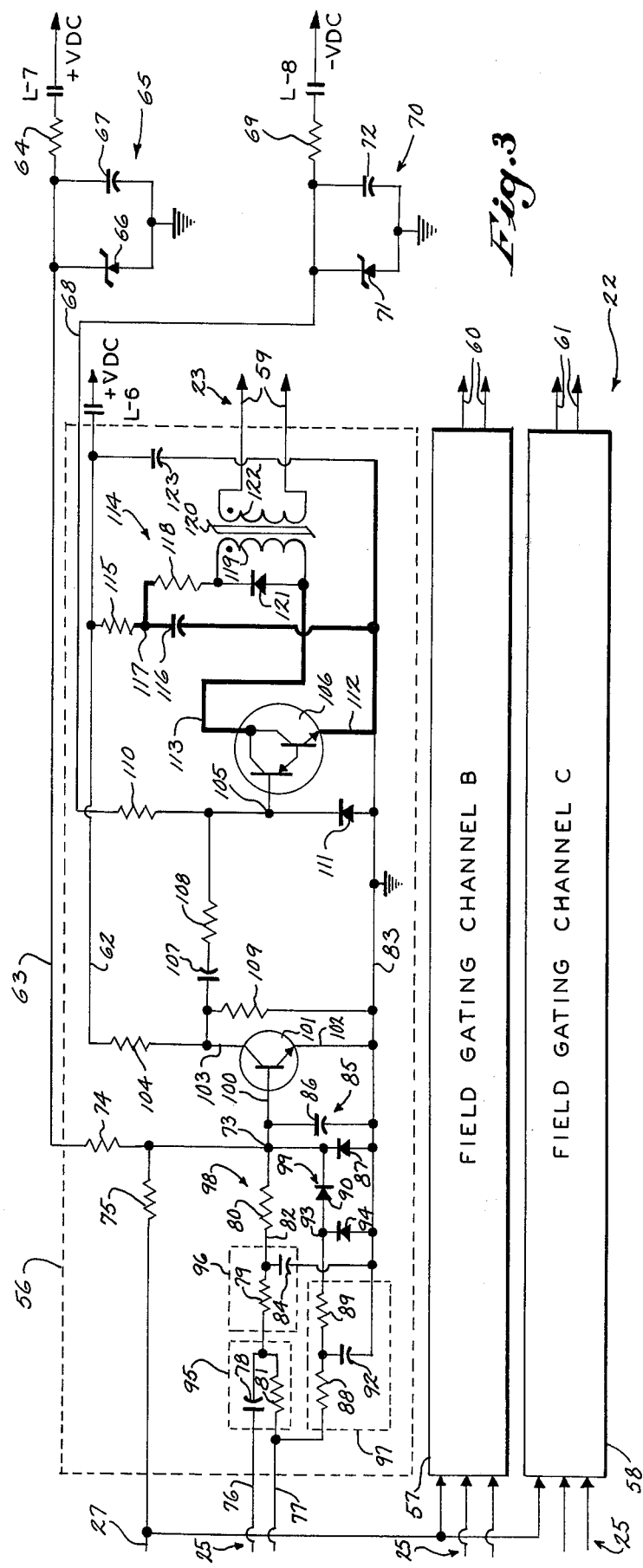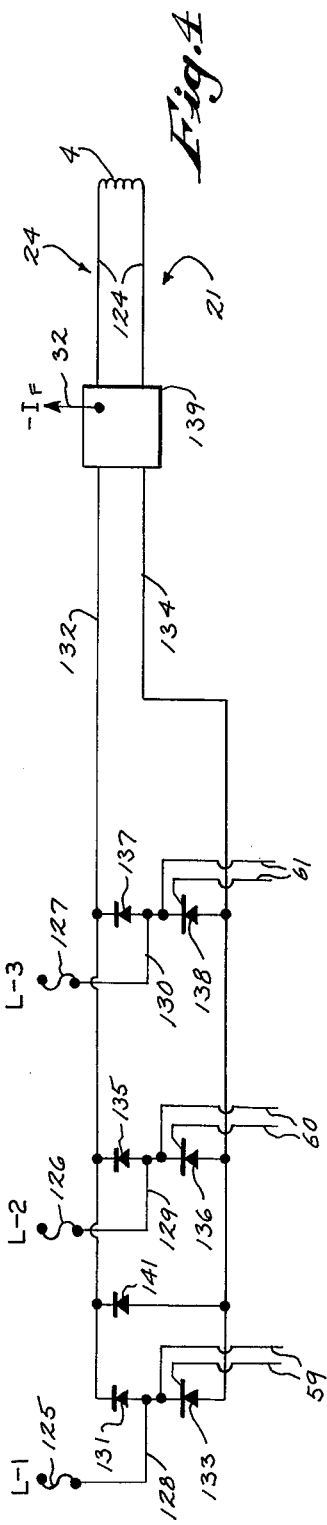
Fig.3
Fig.4

TRANSPORTATION SYSTEM WITH MOTOR FIELD CONTROL

BACKGROUND OF THE INVENTION

This invention relates to a transportation system and specifically to an apparatus which controls the energization of a field circuit of a motive means moving and stopping a vehicle within the system.

D.C. motor control systems utilized for general motor applications have employed various speed regulating control loops in order to provide a full range of control. Some systems have held the field energization at a constant magnitude and variably controlled the armature voltage up to a predetermined base speed. Such systems have thereafter held the armature energization at a constant magnitude and variably controlled the field and particularly weakened the field in order to increase the speed above the predetermined base speed. Many of such systems have sensed the speed of the motor by using a tachometer for providing a speed proportional signal utilized in controlling the selective energization of the field in accordance with the varying speed characteristics provided by the motor output.

Other D.C. motor systems have sensed the controlled armature current supplied to the armature circuit for providing an armature current indicative signal for combination with a command signal to control the gating of uni-directional current to the field circuit. Some of these systems have been responsive to an excessive condition of the back EMF across the motor armature for discontinuing the current flow through the field coil thereby increasing the speed of the operating motor above the base speed.

Several known transportation systems such as battery powered vehicles have selectively controlled the conduction of direct current from the battery to the armature and field circuits of a D.C. motor and further operate to recharge the battery during certain sequences of the operation. One known system has controlled the operation of thyristors to selectively conduct the direct current from a battery to a D.C. motor field circuit in response to the sensed speed of the vehicle, the current flowing in the armature circuit, the commanded or desired field current and the actual field current supplied to the D.C. motor. One system as shown in U.S. Pat. No. 3,735,220 employs a first summing circuit responding to a minimum predetermined field current command signal, a speed signal and a sensed armature current signal for providing an output to a second summing circuit connected to receive a second field current command signal and a field current indicative signal with the second summing circuit interconnected to a third summing circuit which, in turn, is coupled to receive a predetermined braking current command signal, an armature current signal and a speed responsive signal so that the field current is controlled with an output to the controlled thyristors from the second summing circuit.

SUMMARY OF THE INVENTION

This invention relates to a transportation system and specifically to an apparatus which supplies controlled amounts of energy to a field circuit of a motive means. The transportation system of the present invention provides a guide path structure in which a transport vehicle is selectively moved in a path extending adjacent a plurality of landings by the selective operation and control of a motive means. A field circuit of the motive means is selectively supplied unidirectional energy in accordance with the selective control of a gated rectifying means coupled to a source of polyphase energy in response to the operation of a gating control means. A summing means within the gating control means receives an alternating reference signal varying in response to the varying source energy, a constant reference signal, and a field energy command signal in response to commanded vehicle movement to provide an output in response to the alternating and constant reference signals and the command signal to operatively control the operation of the gated rectifying means and thus the selective supply of varying amounts of uni-directional energy to the field circuit.

A disable signal is supplied to the summing means which is responsive to the phase relationship of the source and operatively prevents the conduction of energy to the field circuit by the gated rectifying means during predetermined portions of each cycle of the source energy. In a preferred construction, the gated rectifying means is disabled in response to the disable signal during one hundred eighty electrical degrees of the source frequency and thus provides operative conductive control over the gated rectifying means during the other one hundred eighty electrical degrees. The disable signal operatively provides a proper phase relationship with respect to the source frequency by utilizing a lag filter network in connecting the summing circuit to the source. Such a lag filter also provides added stability to the circuit operation.

In a preferred construction, a lead filter network and a lag filter network are utilized to connect the summing circuit to the source so that the alternating reference signal is supplied with a proper operating phase sequence with respect to the source frequency for properly controlling the conduction of the controlled rectifying means during a proper portion of each alternating cycle. Such filter networks also have the added advantage of providing a stable circuit operation.

The preferred construction of the summing means includes a plurality of summing circuits while a plurality of alternating reference signals correspond to the plurality of phases of energy. Each summing circuit corresponds to one of the phases and appropriately controls a controlled rectifying circuit corresponding and connected to a respective incoming energy phase. A particular summing circuit will thus receive an alternating reference signal corresponding to the controlled phase and also an appropriate disable signal responsive to the associated energy phase.

The gating control means includes a selectively operable switching circuit which responds to the constant and alternating reference signals and the lack of the field energy command signal to operatively render the gated rectifying means conductive during a predetermined portion of each cycle of source energy to provide a predetermined magnitude of direct current field energy. such response by the gating control means is highly desirable in a transportation system such as an elevator in that an abnormal disconnection of the field energy command signal during movement of the vehicle will not creat a dangerous operating condition by the complete loss of field energy. In a preferred construction, the gating control circuits are designed to be rendered conductive during approximately sixty electrical degrees of each cycle of the alternating source frequency which has been found sufficient to maintain proper energizing control over the transport vehicle.

The switching circuit which operates in response to the alternating source reference signal, the constant reference signal and the field energy command signal selectively operates from a first condition to a second condition thereby supplying gating pulses from a storage circuit to the gated rectifying means for rendering the rectifying means conductive. In this regard, a highly desirable two-stage switching circuit is provided wherein the first stage is directly coupled to receive the output of the summing circuit while the second stage selectively operates in response to the output of the first stage and further provides an output circuit connected to a storage means through a primary winding of an output transformer with the transformer providing an output winding directly connected to the gated rectifying means.

Another summing means provides an output operatively controlling the energy supplied to the field circuit in response to the direct summation of a plurality of signals. Specifically, a first signal supplied from a command circuit which dictates a first predetermined magnitude of field energization is summed with a second signal varying according to the varying sensed field energy and a third signal varying according to the varying sensed armature energy. In a preferred construction, a field energy command signal is directly summed with an armature current indicative signal and a field current indicative signal to control the amount of field energy supplied to the motive means.

A D.C. motor may be employed such as commonly utilized with elevator type systems which is designed and built to operate for a short period of time with a field current far exceeding the rated maximum field current and with armature current far exceeding the rated maximum armature current generally recommended for such motor. Such D.C. motors can can be utilized with motor-generator set type applications and also with direct static drive applications as disclosed in the preferred embodiment herein. When initiating commanded movement of the transportation vehicle, the command means provides a first signal commanding a first predetermined magnitude of field energization which generally corresponds to the rated maximum field current disigned for D.C. motor field energization over a long period of time. Sensing means responds to the flow of armature current to the D.C. motor providing accelerating torque to the vehicle and supplies an armature current indicative signal for direct summation with the first command signal to thereby operatively provide a second predetermined magnitude of field energization greater than the first rated magnitude in response to the increase of the armature current. It has been found that the forcing of field energy in response to the field command signal and the armature current indicative signal requires the field to be energized to a much greater magnitude during the initial stages of acceleration.

Such field forcing at the initiation of vehicle movement would build up the field energy to an exceptional high maximum field energy magnitude, such as possibly 260 percent of the rated field current for example, if it were not for the field current indicative signal being fedback to the summing circuit to limit the field energy buildup. With the field current indicative signal being summed at the summing circuit in opposition to the first command signal and the armature current indicative signal, the maximum attainable field current will approach a lesser predetermined magnitude, such as approximately 200 percent of the rated field current.

Thus in a preferred operation in which the vehicle is accelerated from zero velocity to a maximum constant velocity, the field current will rapidly increase upon the commanded initiation of vehicle movement in response to the first command signal so that the field will rapidly increase to approximately 100 percent of the rated field current prior to the initiation of supply of armature current to the D.C. motor. The subsequent supply of armature current rapidly builds up in the armature windings to a magnitude of approximately 100 percent of the rated armature current for the D.C. motor and thereafter increases to an increased armature current magnitude, such as approximately 250 percent of the rated armature current when the elevator car is traveling in an upward direction with a full load. The control means responds to the increase of the armature current and increases the field current to an increased magnitude, such as approximately 200 percent of the rated field current for the D.C. motor. The subsequent decrease in the armature current when the vehicle is nearing the constant velocity sequence of operation also operatively decreases the field current so that at attaining constant velocity operation both the armature current and the field current are returned to their normal 100 percent rated operating condition for continued vehicle operation during the constant velocity sequence.

The preferred construction provides a switching means connected to receive an analog signal from the summing means which varies in response to the direct summation of the field command signal, the armature current indicative signal and the field current indicative signal. Such a switching circuit thus selectively operates to provide an output varying between a first condition and a second condition to control the amount of energy flowing between the source and the field circuit.

A command signal supplied to the summing circuit is provided by a command circuit providing a substantially constant signal having a first polarity which is combined with a second polarity signal supplied by a feedback circuit varying in accordance with the field current for opposing the command signal. As previously mentioned, the armature current indicative signal provides a polarity which combines or sums with the command signal and opposes the field indicative signal.

A highly desirable summing means is thus provided which combines a field energy command signal, an armature current indicative signal, a field current indicative signal, a constant reference signal, a source alternating phase indicative signal, and a source responsive disable signal to uniquely control the amount of current supplied to the field circuit of a D.C. motor operating a transportation vehicle. Such a unique summing means is operatively coupled to operate a controlled rectifying means coupled to operatively convert polyphase energy into controlled varying amounts of uni-directional energy for energizing the field windings. Applicant has provided a highly desirable transportation system by combining two summing circuits with highly desirable switching circuits for selectively rendering the controlled rectifying devices operative to precisely control the energization of the field circuit.

BRIEF DESCRIPTION OF THE DRAWINGS

The drawings furnished herewith illustrate a preferred construction of the present invention in which the above advantages and features are clearly disclosed as well as others which will be clear from the following description.

In the drawings:

FIG. 3 is a circuit schematic showing the field gating circuit of FIG. 1;

FIG. 4 is a circuit schematic showing the field static power converter of FIG. 1;

DESCRIPTION OF THE PREFERRED ILLUSTRATED EMBODIMENT

Figures 1, 2:
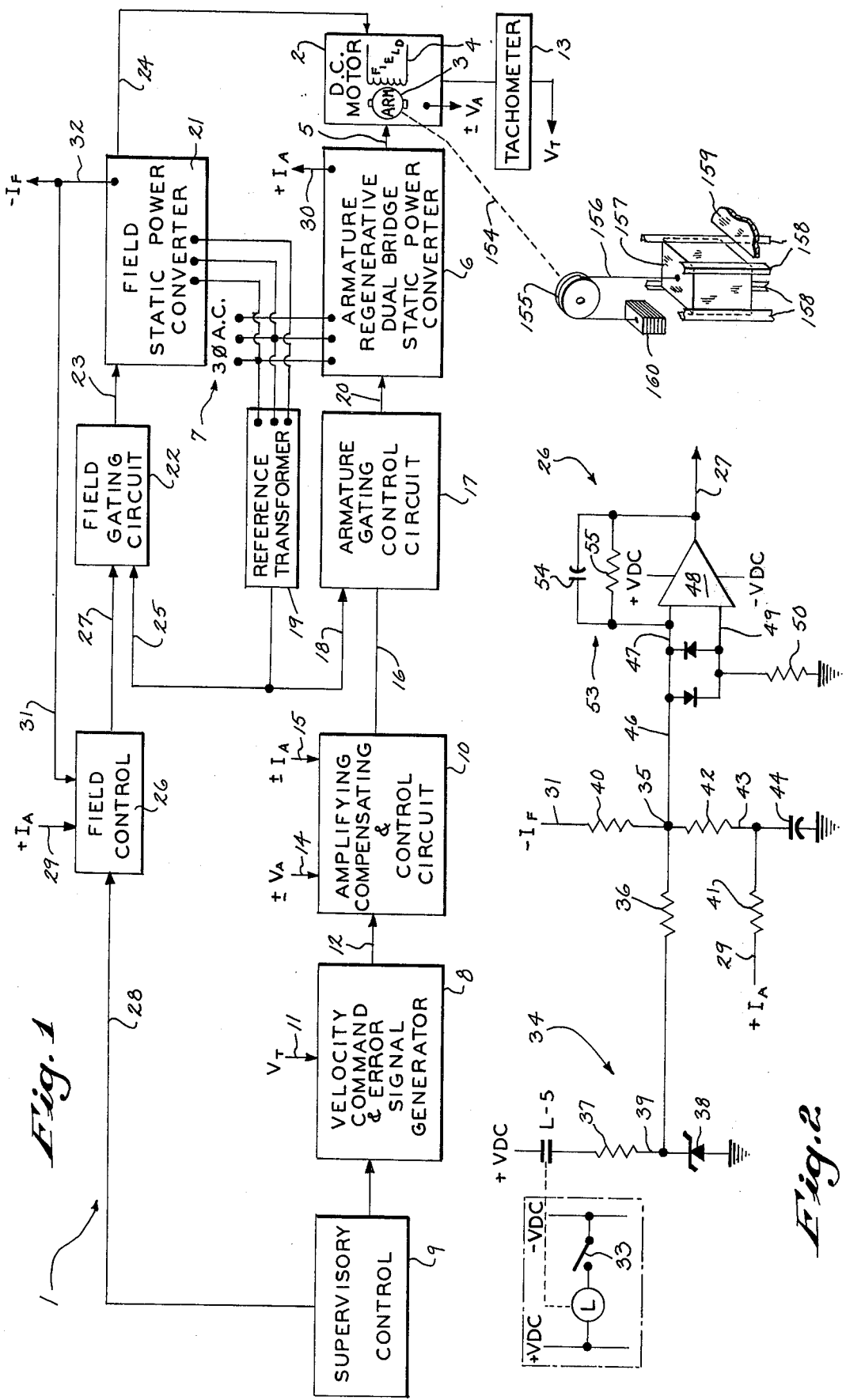
FIG. 1 is a block diagrammatical view illustrating an elevator system incorporating the present invention.
FIG. 2 is a circuit schematic showing the field control circuit of FIG. 1.

Referring to the drawings and particularly FIG. 1, the transportation system includes an elevator system 1 having a direct current drive motor 2 with an armature circuit 3 and a shunt field circuit 4. The armature circuit 3 is connected through an input circuit 5 to an adjustable source 6 of direct current power. The direct current source 6 includes a pair of parallel connected, full-wave controlled bridge rectifying networks which are connected to a three-phase alternating current input 7 and selectively provide controlled amounts of direct current and voltage to the D.C. motor input circuit 5 and thus to the armature 3. Each bridge network includes a plurality of controlled rectifier devices which are phased controlled to convert electrical power between alternating and direct current by controlling the conduction or firing angle of the controlled rectifier devices. The utilization and selective control of the controlled rectifiers within the bridge networks permits the direction of direct current flow through the armature circuit 3 to be reversed when desired to provide regenerative braking control as well as forward and reverse operation of the D.C. motor 2. The controlled source 6 can be connected and operated as illustrated in the patents to Maynard, U.S. Pat. Nos. 3,716,771 issued on Feb. 13, 1973 and 3,683,252 issued on Aug. 8, 1972 and the patent to Maynard et al, U.S. Pat. No. 3,551,748 issued on Dec. 29, 1970. It is understood, however, that source 6 could constitute a direct current generator of a motor-generator set in which the field of the generator is controlled to provide the desired magnitude of uni-directional potential.

The magnitude and direction of direct current flow applied to the armature 3 by the source 6 is controlled by a velocity command and error signal generator 8 in response to a command from a supervisory control 9 as applied through an amplifying, compensating and control circuit 10. Specifically, the signal generator 8 develops a vehicle speed pattern command signal which is summed with a speed responsive signal $V_T$ appearing at a lead 11 to provide an error speed signal output at a lead 12. A tachometer 13 is coupled to the drive shaft of the D.C. motor 2 and supplies the speed responsive signal $V_T$ to the lead 11 which is directly proportional the the speed of rotation of the motor drive shaft and thus the velocity of the car.

The amplifying, compensating and control circuit 10 is connected to a lead 14 which supplies a signal $V_A$ from the armature circuit 3 which is proportional to the armature voltage and is further connected to a lead 15 which supplies a signal $I_A$ from the source 6 proportional to armature current. Generally, the armature current signal $I_A$ and the armature voltage signal $V_A$ are supplied to the compensating circuits within 10 to compensate for motor operating losses while providing a continuous armature current limit. The output at a lead 16 from the control circuit 10 is coupled to control an armature gating control circuit 17 which also receives a phase signal input on a lead 18 from a reference transformer 19 and functions to provide an output at 20 for controlling the operation of the static power converter 6. The armature gating control circuit 17 thus operates to selectively enable the dual bridge networks within the static power converter 6 for providing controlled amounts of both forward and reverse directions of energizing power to the armature circuit 3 according to the selective firing of the controlled rectifiers and the phase relationship of the incoming three-phase power supply 7.

A field static power converter 21 is coupled to receive an alternating three-phase power input from the source 7 and is further coupled to a field gating circuit 22 through an input 23 to selectively supply energizing power through an output 24 to energize the field circuit 4 of the D.C. motor 2. The field gating circuit 22 is coupled to receive a reference signal from the reference transformer 19 through an input circuit 25 and is also coupled to receive a control signal from a field control circuit 26 through an input 27. The field control circuit 26, in turn, is coupled to respond to the operation of the supervisory control 9 through an input illustrated at 28 and also receives an armature current signal at an input 29 which is supplied from an armature current output 30 at the static power converter 6. The field control 26 is further coupled to receive a field current signal-$I_F$ at an input 31 which is supplied from the field static power converter 21 at an output 32.

The elevator system 1 is more fully disclosed in the copending application of J. Maynard having Ser. No. 465,271, filed on Apr. 29, 1974 and entitled "TRANSPORTATION SYSTEM WITH MALFUNCTION MONITOR" and in the copending applications of C. Young and J. Maynard having Ser. Nos. 465,270 and 465,272, filed on Apr. 29, 1974 and entitled "CONTROL SYSTEM FOR A TRANSPORTATION SYS- TEM " and "TRANSPORTATION SYSTEM WITH DECELERATING CONTROL" respectively, and such applications are incorporated by reference herein.

The field control 26 is shown in schematic form in FIG. 2 along with a portion of the supervisory control 9, the latter being diagrammatically illustrated as utilizing relays and manually operable switches for the sake of clarity and it is understood that the supervisory control 9 could utilize various solid-state logic circuits or interconnecting relays and associated contacts such as more fully described in the above mentioned application entitled "TRANSPORTATION SYSTEM WITH MALFUNCTION MONITOR". In any event, the supervisory control 9 is illustrated as including a line contactor relay L selectively connected in circuit through an open switch 32 for selective energization by a positive constant potential D.C. voltage source +VDC and a negative constant potential D.C. voltage source −VDC.

The field control circuit 26 includes a command input 34 connected to a summing circuit 35 through a resistor 36. The command input circuit 34 includes a positive constant potential D.C. voltage source +VDC which is connected to the system ground through the normally open contacts L-5 of the line contactor relay, a resistor 37 and a Zener diode 38 with a coupling circuit 39 between resistor 37 and diode 38 connected to the resistor 36. The summing circuit 35 is also connected to receive a field current proportional signal appearing at lead 31 through a resistor 40 and an armature current proportional signal appearing at lead 29 through the resistors 41 and 42. The connecting circuit 43 between resistors 41 and 42 is connected to the system ground through a capacitor 44.

An output circuit 46 is connected to the summing circuit 35 and to an inverting input 47 of an operational amplifier 48 functioning as a comparator to provide a switching amplifier and provides a non-inverting input 49 connected to the system ground through a resistor 50. A pair of parallel connected and oppositely diodes 51 and 52 are connected between the inputs 47 and 49 to protect the switching amplifier 48 from abnormal transient conditions. The switching amplifier 48 provides an output to the lead 27 which is also connected to the input lead 47 through a feedback circuit 53 including a parallel connected capacitor 54 selected to stabilize and regulate the operation of the switching amplifier 48.

The field gating circuit 22 is shown in FIG. 3 and includes three gating control channels 56, 57 and 58 with each channel effective for providing operative control over a corresponding input phase of the incoming three-phase power supplied from the source 7 to the field static power converter 32. The channels 56, 57 and 58 are connected to the output lead 27 for receiving signals from the switching amplifier 48. The channels 56, 57 and 58 each provide a pair of output leads 59, 60 and 61, respectively, to provide the output 23 for controlling the operation of the field static power converter 21. The channels 56, 57 and 58 are similarly constructed so that only channel 56 will be described in detail and it is understood that channels 57 and 58 operate in a similar manner with appropriate phase related signals in accordance with the teachings herein as clearly understood by one skilled in the art.

The gating channel 56 employs a number of control signals for properly controlling the conduction or firing angle of the associated controlled rectifier during an appropriate period of each source cycle to provide the desired uni-directional current output to energize the field circuit. A lead 62 is connected to a positive constant potential direct current source +VDC through the normally open contacts L-6 of the line contactor relay and provides a constant positive voltage, such as +34 volts D.C. A lead 63 is connected to a positive constant potential direct current voltage source +VDC through a resistor 64 and the normally open contacts L-7 of the line contactor relay to provide a constant positive voltage, such as +13 volts D.C. for example. The lead 63 is coupled to the system ground through a filtering and stabilizing circuit 65 which includes a parallel connected Zener diode 66 and capacitor 67. A lead 68 is connected to a negative constant potential voltage source −VDC through a resistor 69 and the normally open contacts L-8 of the line contactor relay and provides a constant negative voltage, such as −13 volts for example. The input lead 68 is coupled to the system ground through a stabilizing and filtering network 70 which includes a parallel connected Zener diode 71 and capacitor 72.

The channel 56 includes a summing circuit 73 which is connected to the reference lead 63 through a resistor 74 and to the lead 27 through a resistor 75. The summing circuit 73 is also connected to the reference transformer 19 through the input 25 which includes a pair of input leads 76 and 77. The lead 76 is coupled to the summing circuit 73 through a series connected circuit including a capacitor 78, a resistor 79 and a resistor 80. The lead 77 is coupled to the summing circuit 73 through a resistor 81 and the resistors 79 and 80. A connecting circuit 82 between the resistors 79 and 80 is connected to a system ground lead 83 through a capacitor 84 while the summing circuit 73 is coupled to the ground lead 83 through a protective circuit 85 including a parallel connected capacitor 86 and diode 87 utilized for protection from abnormal transient conditions. The input lead 77 is further connected to the summing circuit 73 through a series connected circuit including a resistor 88, a resistor 89 and a diode 90. A connecting circuit 91 between resistors 88 and 89 is coupled to the ground lead 83 through a capacitor 92 while a connecting circuit 93 between the resistor 89 and diode 90 is connected to the ground lead 83 through a diode 94.

The capacitor 78 and the resistor 81 function to provide a lead filtering circuit 95 while the resistor 79 and the capacitor 84 function to provide a lag filtering circuit 96 and the resistors 88 and 89 together with the capacitor 92 function to provide a lag filtering circuit 97. The filtering networks 95 and 96 together with the resistor 80 thus provides a A. C. source reference control input circuit 98 to the summing circuit 73 while the filtering network 97 together with the diodes 90 and 94 provide a source reference disable input circuit 99.

The summing circuit 73 is connected to a base circuit 100 of an NPN type transistor 101 having an emitter circuit 102 connected to the system ground lead 83 and a collector circuit 103 connected to the lead 62 through a resistor 104. The collector circuit 103 is also connected to a base circuit 105 of a Darlington pair type transistor circuit 106 through a serially connected capacitor 107 and a resistor 108. The collector circuit 103 of the transistor 101 is also connected to the system ground lead 83 through a resistor 109. The base circuit 105 of the Darlington circuit 106 is connected to the voltage lead 68 through a resistor 110 and is also connected to the system ground lead 83 through a diode 111. An emitter output circuit 112 of the Darlington circuit 106 is connected to the system ground lead 83 and a collector circuit 113 is connected to the voltage lead 62 through an output circuit 114.

The output circuit 114 includes a resistor 115 connected to the lead 62 and connected to the ground lead 83 through a serially connected capacitor 116. A junction circuit 117 connecting the resistor 115 and the capacitor 116 is connected to the collector circuit 113 through a resistor 118 and a primary winding 119 of a transformer 120. A diode 121 is parallel connected to the primary winding 119 of the transformer 120. The transformer 120 further provides an output winding 122 directly connected to the output leads 59 and selectively supplying firing control pulses to the field static power converter 21. A capacitor 123 is coupled between the voltage lead 62 and the system ground lead 83.

The field static power converter 21 along with the field windings 4 of the D.C. motor 2 are illustrated in FIG. 4. Additional circuitry could be added to the circuits of FIG. 4 to provide a combined brake and field static power converter as disclosed in the above mentioned application entitled "TRANSPORTATION SYSTEM WITH MALFUNCTION MONITOR".

The field static power converter 21 is connected to the three-phase A. C. input 7 by the leads designated as L1, L2 and L3 and operates to supply controlled amounts of direct current to the motor field circuit 4 through a pair of leads 124 constituting the output 24.

The three power leads L1, L2 and L3 are connected through the fuses 125, 126 and 127, respectively, to supply a phase A input at a lead 128, a phase B input at a lead 129 and a phase C input at a lead 130.

The phase A lead 128 is connected to the anode circuit of a diode 131 which, in turn, is connected to a direct current output lead 132. The lead 128 is also connected to a cathode circuit of a controlled rectifier 133 which, in turn, is connected to a direct current output lead 134. The phase B lead 129 is conncetcd to the output lead 132 through a diode 135 and to the output lead 134 through a controlled rectifier 136 while the phase C lead 130 is connected to the output lead 132 through a diode 137 and to the lead 134 through a controlled rectifier 138.

The controlled rectifiers 133, 136 and 138 are connected to the gating inputs 59, 60 and 61, respectively, with each gating input including one lead connected to a gating circuit of the controlled rectifier and a second lead connected to the cathode circuit for selectively rendering each control rectifier conductive in response to a command gating pulse provided by the field gating circuit 22. The output leads 132 and 134 are directly connected to the field circuit 4 through the leads 124 while a transformer circuit 139 senses the selectively variable uni-directional field current supplied to the field circuit 4 to provide a signal $-I_F$ proportional to the field current at the output lead 32.

A fly-back diode 141 is parallel connected to the field winding 4 and has a cathode circuit connected to the lead 132 and an anode circuit connected to the lead 134.

In operation, the field static power converter 21 is controlled by the field gating circuit 22 for selectively conducting direct current through the output leads 132 and 134 to the field winding 4 through the output leads 124 while the amount of direct current supplied to the field is sensed by the transformer 139 to provide the field current proportional output signal $-I_F$ at the output lead 32.

The gating channels 56, 57 and 58 within the field gating circuit 22 selectively supply gating pulses through the output leads 59, 60 and 61 to control the conduction of the controlled rectifiers 133, 136 and 138, respectively. As an illustrative example of the circuit operation, a gating signal supplied on output leads 59 from the channel 56 renders the control rectifier 133 conductive during the appropriate phase sequence of the A. C. input appearing at L1, L2 and L3 so that field current is permitted to flow from the phase B lead 129 through the diode 135 to the output lead 132 and from the phase C lead 130 through the diode 137 to the output lead 132. The field current flowing through the output lead 132 is thus supplied to the field winding 4 through the leads 124 and returns through the output lead 134 and the controlled rectifier 133 which has been rendered conductive to the phase A lead 128. The current flow through the diodes 131, 135 and 137 will thus depend upon the relative polarity of the phase signals supplied at inputs 128, 129 and 130, respectively, and the selective conduction of one of the controlled rectifiers 133, 136 and 138 during an appropriate portion of each alternating phase cycle.

The selective control over the controlled rectifiers 133, 136 and 138 thus provides a highly desirable static power converter for converting an alternating current input to a direct current output for providing a highly controlled and regulated field current through the field circuit 4.

Figure 6:
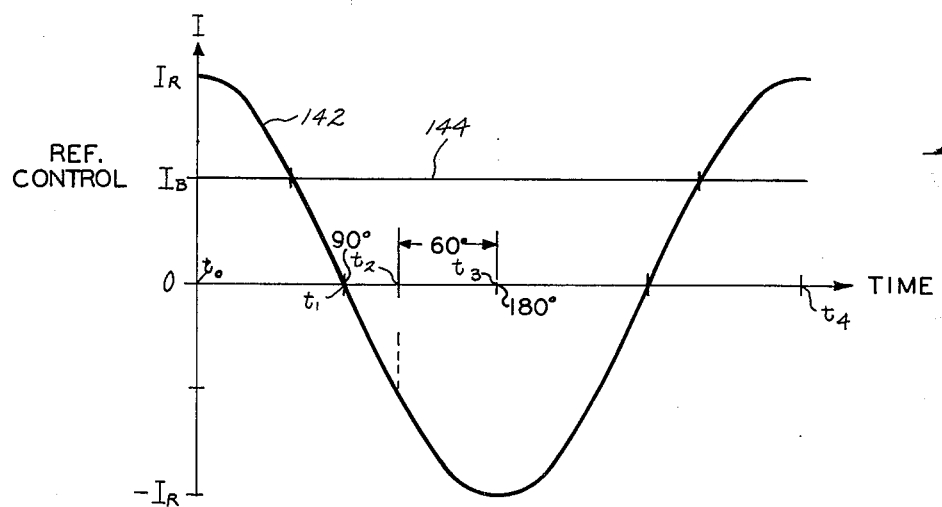
FIG. 6 is a diagrammatic graphical illustration showing an alternating source reference signal as a plot against time and a constant reference signal employed in the field gating circuit of FIG. 3.

The phase input circuit 25 is connected to the reference transformer 19 to provide an alternating phase reference signal at the input lead 76 proportional to the alternating voltage between a neutral reference potential and the phase A voltage supplied by the source 7 while the input lead 77 provides an alternating phase reference signal proportional to the reference signal supplied at input 76 but shifted in pahse by one hundred eighty electrical degrees. The two reference signals supplied at the leads 76 and 77 are combined in the lead filter circuit 95 to supply an alternating reference signal output to the resistor 79 which leads the reference signal at lead 76 by ninety electrical degrees. The filter circuit 96 receives the reference signal from the filter circuit 95 and provides an alternating reference signal to the resistor 80 and thus to the summing circuit 73 which lags the reference signal supplied from the circuit 95 by thirty electrical degrees. The lead and lag filter networks 95 and 96 thus provide a phase reference control signal 142 to the summing circuit 73 through the resistor 80 as illustrated in FIG. 6 which has the proper phase relationship to control the conduction of the rectifier 133.

Figure 7:
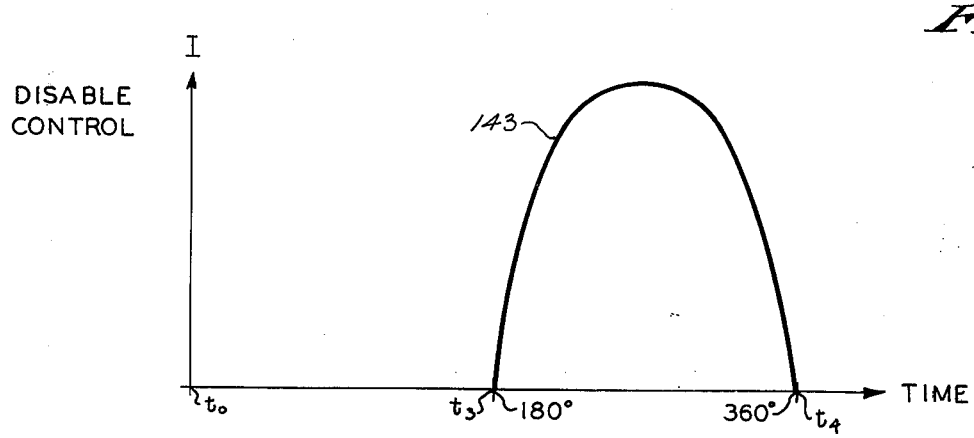
FIG. 7 is a diagrammatic graphical illustration showing a disable control signal appearing as a plot against time which is employed the field gating circuit of FIG. 3.

The lag filter circuit 97 responds to the phase signal appearing at the lead 77 and provides an alternating reference signal to the connecting circuit 93 which lags the signal at lead 77 by thirty electrical degrees. The alternating signal provided by the lag filter circuit 97 is half-wave rectified by the diodes 90 and 94 to provide a disable signal 143 illustrated in FIG. 7 to the summing circuit 73.

When initiating an operating sequence to move the vehicle, the switch 33 in FIG. 2 is closed to energize the line contactor relay L and close the contacts L-6, L-7 and L-8 to supply constant potential signals to the leads 62, 63 and 68. A positive signal 144 as illustrated in FIG. 6 is supplied from the lead 63 through the resistor 74 to the summing circuit 73 and thus to the base circuit 100 which, by itself, tends to render the transistor 101 continually conductive. The conduction or turning "on" of the transistor 101 operatively connects the resistor 104 to the system ground and renders the Darlington circuit 106 non-conductive or turned "off" to operatively open circuit the primary winding 119 and prevent an output pulse from issuing on the lead 59 to maintain the controlled rectifier 133 in a non-conductive state so as not to conduct field current to the windings 4. The transistor 101 is selectively turned off to operatively turn on the Darlington circuit 106 and provide a firing pulse from the source 116 through the transformer 120 and to the output leads 59 whenever the summated signal magnitude appearing at the base circuit 100 reaches a very low predetermined positive magnitude substantially at zero. or goes negative.

The disable signal 143 is summed or added with the reference signal 144 at the summing circuit 73 to maintain the transistor 101 conductive and the Darlington circuit 106 nonconductive between the time periods designated as times $t_3$ and $t_4$ which occur during each cycle of the source frequency irrespective of the signals supplied through resistors 75 and 80. The disable signal 143 illustrated in FIG. 7 therefore completely disables the controlled rectifier 133 during one hundred eighty electrical degrees of each source alternating cycle. In other words, the controlled rectifier 133 is capable of being selectively rendered conductive between the time periods designated as times $t_0$ and $t_1$ in FIG. 6 and provides one hundred eighty electrical degrees of control to supply a variable uni-direction current output.

The alternating reference signal 142 supplied through the resistor 80 to the summing circuit 73 will cyclically vary between positive and negative magnitudes. In a very important aspect of the invention, the alternating reference signal 142 will sum with the signals 143 and 144 at the summing circuit 73 and operatively turn the transistor 101 off between the times designated $t_2$ and $t_3$ even though a command signal is not being supplied through the resistor 75 from the field control 26. The turning off of the transistor 101 operatively turns the Darlington circuit 106 on thus permitting the capacitor 116 to discharge to the ground lead 83 through the transformer 120 which, in turn, supplies a gating pulse to render the controlled rectifier 133 conductive. The controlled rectifier 133 remains conductive until being commutated off by the phase A input changing polarity.

Figure 5:
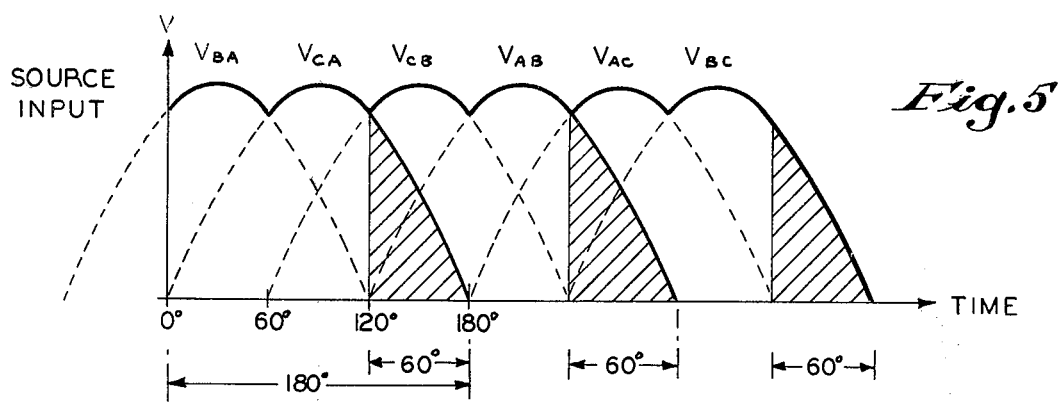
FIG. 5 is a diagrammatic graphical illustration showing the rectified portions of the source input voltage wave forms appearing as a plot against time of which selected portions are gated to the field circuit of FIG. 1.
Figure 8:
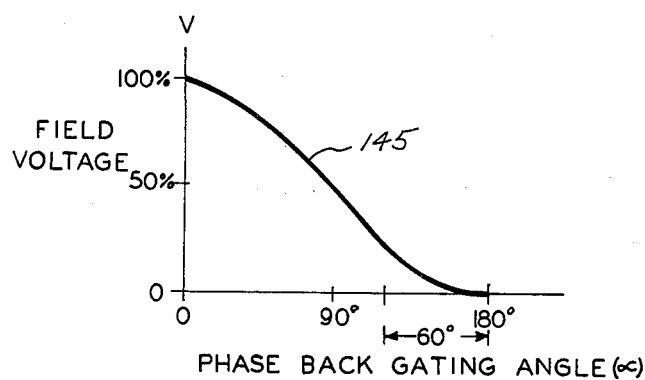
FIG. 8 is a diagrammatic graphical illustration showing the percentage of field voltage provided by the static power converter in FIG. 4 as a function of the phase back gating angle established by the field gating circuit of FIG. 3 and the field control circuit of FIG. 2.

The conduction of the controlled rectifier 133 between the times $t_2$ and $t_3$ in response to the summation of the alternating reference signal 142, the disable signal 143 and the constant reference signal 144 and the lack of a command signal supplied from the field control 26 provides a highly desirable and safe operating sequence. Thus if for an unknown reason the input supplied from the field control 26 at the lead 27 is disconnected or vanishes during a vehicle moving sequence, the field gating circuit will automatically provide sixty electrical degrees of conduction during each source cycle by the controlled rectifiers 133, 136 and 138 as represented by the cross-hatched areas in FIG. 5. The 60° electrical of control is illustrated in FIG. 8 and is effective to operate the static power converter 21 to provide approximately 23 percent of the maximum output capability of the converter 21. Applicant has found that the sixty electrical degrees of continual control is sufficient to support the elevator car for a safe operation.

A field energizing command signal is supplied at the input circuit 27 and thus to the summing circuit 73 through the resistor 75 and provides a varying negative signal to selectively render the controlled rectifier 133 conductive between the times $t_0$ and $t_2$ and provides one hundred and twenty electrical degrees of variable control.

FIG. 8 diagramatically illustrates the field voltage output that is provided by the field static power converter 21 over the full one hundred eighty degrees of possible conduction provided by the controlled rectifiers 133, 136 and 138. The field voltage waveform 145 represents the field voltage output $V_F$ supplied to the field circuit 4 by the static converter 21 as a function of the source line to line voltage $V_{LL}$ and the phase angle or phase advance $\alpha$ for the conduction of the rectifiers in the static converter 21 as represented by the formula $V_F = 1.35/2\ V_{LL}(1 + \cos\alpha)$.

The operation of the field control 26 can best be described with reference to FIGS. 9 through 11. It should be noted that the time references $t_0$ through $t_6$ in FIGS. 9 through 11 have no relationship to the time references applied to the FIGS. 5 through 8. At time $t_0$, the switch 33 closes to energize the line contactor relay L and close the contacts L-5 for supplying a field command signal illustrated at 146 in FIG. 10 to the summing circuit 35 through the resistor 36. The signal 146 increases rapidly and maintains a value commanding 100 percent of the rated field current for the D.C. motor 2. The positive command signal 146 at the summing circuit 35 operatively transfers the switching amplifier 48 into saturation to provide a negative polarity command signal at the output lead 27 to the field gating circuit 22.

The alternating reference signal 142 supplied through the resistor 80, the negative command signal supplied through the resistor 75, the constsnt positive reference signal 144 supplied through the resistor 74 and the disable signal 143 supplied through the diode 90 sum at the summing circuit 73 to render the controlled rectifiers in the static converter 21 conductive over the maximum 180° range of conduction. The field current illustrated at 147 in FIG. 10 thus rapidly increases as at 148 until at approximately time $t_1$ the field current $I_F$ approaches approximately 100 percent of the rated field current for the D.C. motor 2. The switching amplifier 48 is designed so that a very small input signal at the lead 47, such as sixty millivolts for example, is sufficient to provide a saturated output at the lead 27, such as minus twelve volts for example, so that the field current rises at a substantially linear rate as illustrated at 148 from the time $t_0$ to the time $t_1$. The negative polarity field current proportional signal supplied to the summing 35 through the resistor 40 opposes the command signal supplied through the resistor 36 and at approximately time $t_1$ provides a very small analog output at lead 46 to take the switching amplifier 48 out of saturation. The negative output supplied at the lead 27 also decreases and remains at a regulated value to maintain the field current at the 100 percent rated value as illustrated at 149 between the times $t_1$ and $t_2$. Such 100 percent rated field current is provided by rendering the controlled rectifiers conductive for approximately ninety electrical degrees in each source cycle.

At time $t_2$, the motor armature timer relay MT is de-energized in response to the energization of the motor armature contactor relay M to energize the armature circuit 3 as more fully described in the previously mentioned application entitled "TRANSPORTATION SYSTEM WITH MALFUNCTION MONITOR". At time $t_2$, the armature gating control circuit 17 is rendered effective to respond to the velocity command generator 8 and the control circuit 10 for operating the static power converter 6 to supply armature current circuit 3 of the D.C. motor 2. Thus between the times $t_2$ and $t_3$, the armature current rapidly increases to approximately 100 percent of the rated value for the D.C. motor 2 as illustrated at 150 in FIG. 9 and the electro-mechanical brake shoes (not shown) are permitted to lift between the times $t_2$ and $t_3$ for permitting elevator movement as illustrated by the velocity proportional signal 151 in FIG. 11.

The armature current is sensed at lead 30 and a positive polarity signal $+I_A$ is supplied to the summing circuit 35 through the resistors 41 and 42 to be combined with the negative polarity fedback field current signal $-I_F$ supplied through the resistor 40 and the positive polarity field command signal supplied through the resistor 36. The switching amplifier 48 responds to the armature current indicative signal to supply an increased negative command signal at lead 27 to the summing circuit 73 to increase the firing angle and thus the conduction of the controlled rectifiers in the static converter 21. As the armature current 150 increases, the field current also increases as at 152. At approximately time $t_4$, the armature current 150 stops increasing and is maintained at a constant magnitude. The analog output of the summing circuit 35 thus decreases to a low magnitude at time $t_4$ and the field current is maintained at approximately 200 percent of the motor rated field current between the times $t_4$ and $t_5$. The system thus takes advantage of the fact that the D.C. motor 2 is an elevator type motor which may be operated for a limited period of time with a field current and an armature circuit greatly exceeding their rated values.

The utilization of the armature current proportional signal $+I_A$ supplied through the resistor 42 to be directly summed with the positive command signal supplied through the resistor 36 theoretically commands a field current output as represented at 153 which would ultimately result in approximately 260 percent of the rated field current for the D.C. motor if it were not for the field current signal fedback to the summing circuit 35 through the resistor 40.

At the time $t_5$, the armature current 150 begins decreasing until at time $t_6$ it stabilizes at approximately 100 percent of the rated armature current for constant velocity operation. The field current 147 between times $t_5$ and $t_6$ also decreases in direct response to the decreasing armature current and at time $t_7$ returns to the 100 percent rated field current magnitude for the constant velocity operation as commanded by the command 34.

Figure 11:
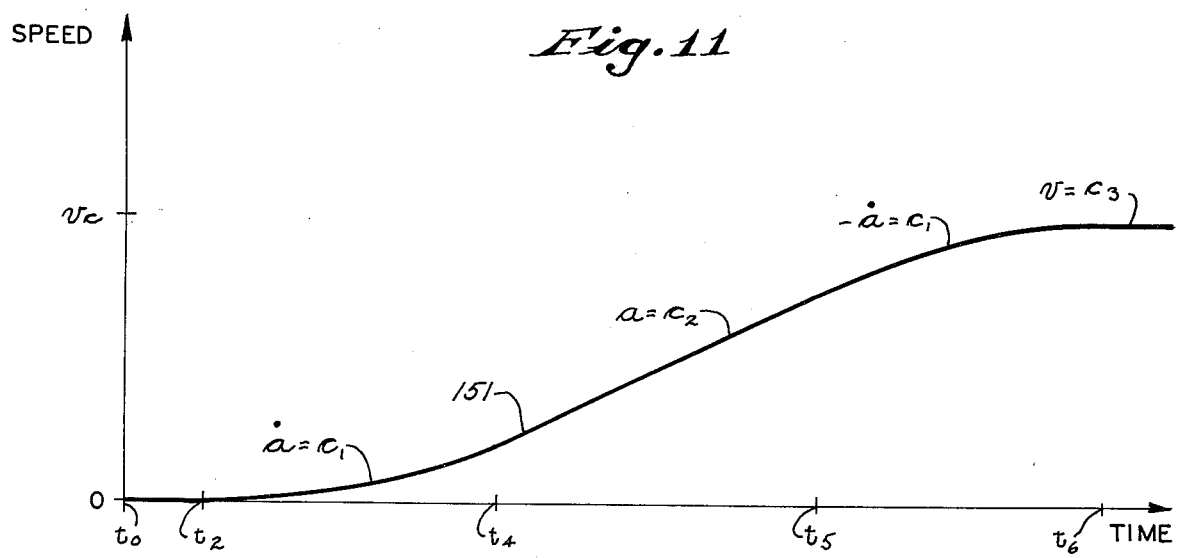
FIG. 11 is a diagrammatic graphical illustration showing the velocity wave form of the vehicle appearing as a plot against time.

The vehicle response is shown in FIG. 11 wherein the velocity response 151 illustrates a positive constant rate of change of acceleration from times $t_2$ to $t_4$, a constant acceleration from the times $t_4$ to $t_5$, and a negative constant rate of change of acceleration from the times $t_5$ to $t_6$ and thereafter providing a constant velocity characteristic.

Figure 9:
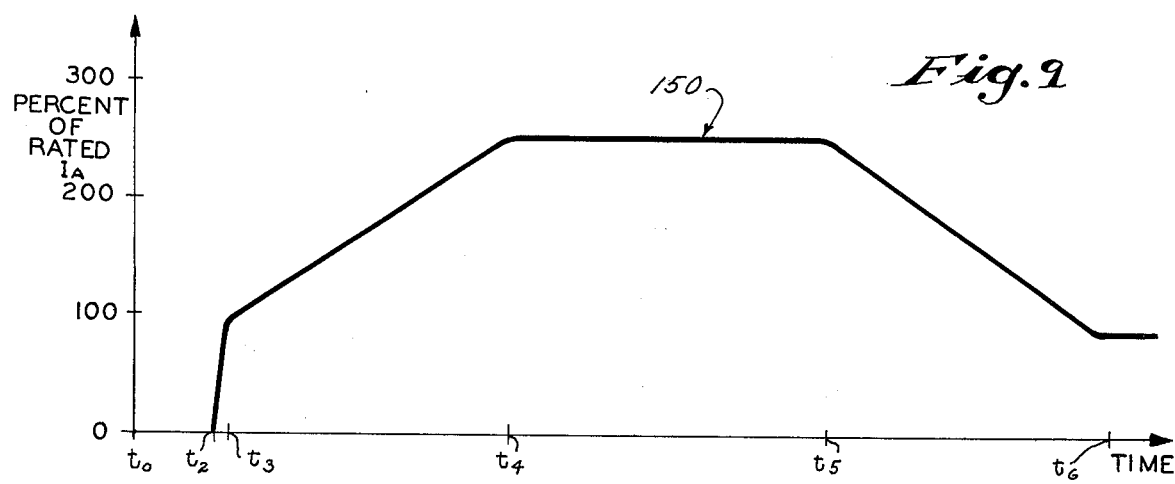
FIG. 9 is a diagrammatic graphical illustration showing an example of the armature current appearing as a plot against time.
Figure 10:
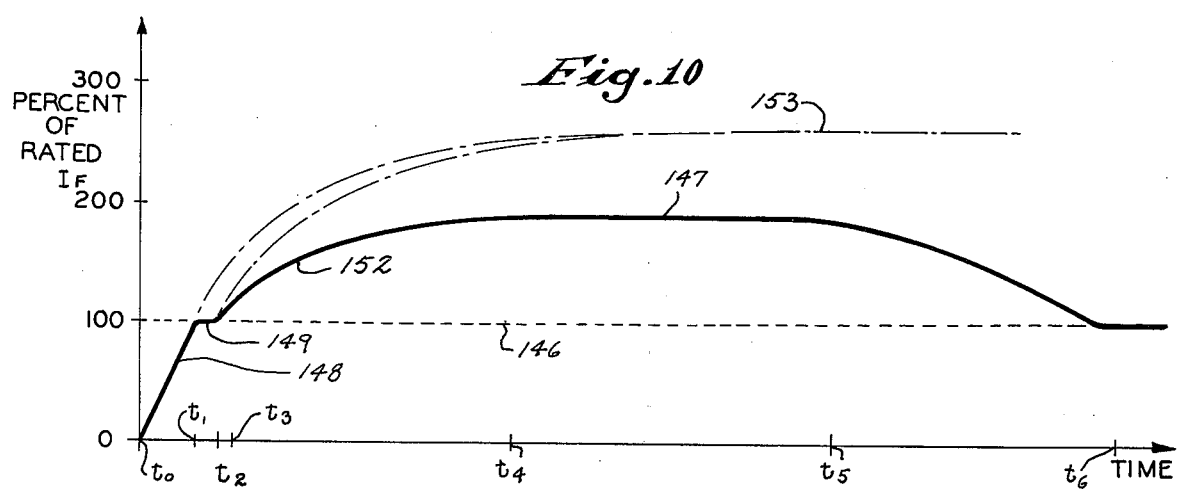
FIG. 10 is a diagrammatic graphical illustration showing an example of the field current appearing as a plot against time together with a field current command signal.

It should be noted that the characteristics set forth in FIGS. 9 through 11 are shown only for illustration to clearly set forth the invention and presuppose an ideal operation with instantaneous response. As a practical manner, it has been found that the field current 147 supplied to the field windings 4 lags in time from the displayed characteristics in FIG. 10 due to the inherent circuit response times.

It is also noted that the output 30 is designed to always provide a positive armature current indicative signal to the summing circuit 35 irrespective of the direction of armature current flow between the source 7 and the armature circuit 3. The field current thus continually responds to changes in the armature current during all phases and sequences of the operation including a regenerative braking sequence during deceleration as well as during an acceleration sequence as described above.

A highly desirable control system is for energizing the field circuit 4 in response to a command signal supplied by the supervisory control, a field current indicative feedback signal, and armature current indicative signal, alternating phase reference signals, disable signals responsive to the source phases, and constant reference signals. The feedback of the field current indicative signal provides a highly regulated operation in which the field current can be maintained at the desired magnitude even though the source input varies.

The present invention thus provides a highly desirable motor field control for a transportation system such as the elevator 1 illustrated in FIG. 1 in which a selectively rotatably output 154 such as a D.C. motor output shaft is coupled to rotatably operate a traction sheave 155. Thus in a customary configuration, a cable 156 is reeved over the sheave 155 with one end connected to control an elevator car 157 guided by rails 158 or the like to serve a plurality of landings such as at 159 while the other cable end is connected to a counterweight 160.

Various modes of carrying out the invention are contemplated as being within the scope of the following claims particularly pointing out and distinctly claiming the subject matter which is regarded as the invention.

I claim.

1. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including phase means having a first input circuit providng an alternating reference signal varying in response to said varying source energy and reference means having a second input circuit providing a constant reference signal and command means having a third input circuit selectively providing a field energy command signal in response to commanded vehicle movement and summing means including a common summing point connected to said first, second and third circuits and providng an output in response to the voltage and current summation of said alternating and constant reference signals and said command signal and operatively controlling the operation of said gated rectifying means and selectively supplying varying amounts of uni-directional energy to said field circuit.

2. A transportation system having a guide path structure and a plurality of spaced landings and transportation means comprises a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including summing means operatively coupled to phase means and receiving an alternating reference signal varying in response to said varying source energy and to reference means and receiving a constant reference signal and to command means and selectively receiving a field energy command signal in response to commanded vehicle movement and providing an output in response to said alternating and constant reference signals and said command signal and a switching circuit operating in response to said output varying in accordance with said alternating reference signal and said constant reference signal and the lack of said field energy command signal and operatively rendering said gated rectifying means conductive during a predetermined portion of each cycle of source energy and providing a predetermined magnitude of direct current field energy to said field circuit.

3. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including summing means operatively coupled to phase means and receiving an alternating reference signal varying in response to said varying source energy and to reference means and receiving a constant reference signal and to commnd means and selectively receiving a field energy command signal in response to commanded vehicle movement and providing an output in response to said alternating and constant reference signals and said command signal operatively controlling switching means having an output selectively operable from a first condition to a second condition and supplying gating pulses from storage means to said gated rectifying means and rendering said rectifying means conductive and selectively supplying varying amounts of uni-directional energy to said field circuit.

4. The system of claim 3, wherein said switching means includes a first switching circuit having a first input circuit connected to said summing means and a first output circuit connected to a second input circuit of a second switching circuit having a second output circuit connected to said storage means through a primary winding of an output transformer, said transformer having an output winding connected to said gated rectifying means.

5. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including summing means operatively coupled to phase means and receiving an alternating reference signal varying in response to said varying source energy and to reference means and receiving a constant reference signal and to command means and selectively receiving a field energy command signal in response to commanded vehicle movement and to disable means and selectively receiving a disable signal and providing an output in response to saaid alternating and constant reference signals and said command signal and said disable signal and operatively controlling the operation of said gated rectifying means and selectively supplying varying amounts of uni-directional energy to said field circuit and disabling said gated rectifying means to prevent the conduction of energy to said field circuit during a predetermined portion of each cycle of source energy.

6. The system of claim 5, wherein said disable means includes a lag filter network operatively coupled to said source and to said summing means to supply said disable signal.

7. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including summing means operatively coupled to phase means including a lead filter network operatively coupled to said source and a lag filter network connecting said lead network to said summing means and supplying an alternating reference signal varying in response to said varying source energy and to reference means and receiving a constant reference signal and to command means and selectively receiving a field energy command signal in response to commanded vehicle movement and providing an output in response to said alternating and constant reference signals and said command signal and operatively controlling the operation of said gated rectifying means and selectively supplying varying amounts of uni-directional energy to said field circuit.

8. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source of said motive means including a gated rectifying means connected to said source and to said field circuit and to gating control means, said gating control means including summing means having a plurality of summing circuits operatively coupled to phase means providing a plurality of alternating reference signals varying in response to said varying source energy and corresponding to said plurality of phases of energy with each summing circuit corresponding to one of said phases and receives an appropriate one of said alternating reference signals relating to said corresponding phase, said summing means operatively connected to reference means and receiving a constant reference signal and to command means and selectively receiving a field energy command signal in response to commanded vehicle movement and providing an output in response to said alternating and constant reference signals and said command signal and operatively controlling the operation of said gated rectifying means and selectively supplying varying amounts of uni-directional energy to said field circuit.

9. The system of claim 8, wherein said gating control means includes a plurality of disable circuits supplying a plurality of disable signals corresponding to said plurality of phases to said plurality summing circuits with each summing circuit receiving one of said disable signals relating to said corresponding phase.

10. A transportation system having a guide path structure and a plurality of spaced landings and a transportation means comprising a transport vehicle, means mounting said vehicle for movement relative to said structure in a path extending adjacent each of said landings, motive means including an armature circuit and a field circuit separately coupled to source means supplying alternating energy, and control means connected to said source means and controlling the amount of energy flowing between said source means and said field circuit and between said source means and said armature circuit, said control means including command means providing a first signal having a first polarity and commanding a first predetermined magnitude of field energization and means sensing the energy flowing between said source means and said field circuit and providing a second signal having a second polarity and proportional to said sensed field energy and means sensing the energy flowing between said source means and said armature circuit and providing a third signal having said first polarity and directly proportional to said sensed armature energy and summing means providing a common summing circuit and directly summing said first, second and third signals and providing an analog output signal at an output operatively connected to control the amount of uni-directional energy supplied to said field circuit from said alternating energy source means.

11. The system of claim 10, wherein said motive means includes a D.C. motor providing field windings having a rated maximum field energy constituting said first predetermined magnitude commanded by said first signal, said output operatively providing a second predetermined magnitude of field energization greater than said first magnitude in response to the increase of said sensed armature energy.

12. The system of claim 11, wherein said D.C. motor provides armature windings having a rated maximum armature energy, said output operatively providing said second predetermined magnitude of field energization in response to the increase of said armature energy to a predetermined magnitude greater than said rated maximum armature energy.

13. The system of claim 10, wherein said analog signal operates switching means having an output selectively operable between a first condition and a second condition and controlling the amount of energy flowing between said source means and said field circuit.

14. The system of claim 10, wherein said source means includes a supply of polyphase energy and said control means includes gated rectifying means connected to receive said polyphase energy and operatively controlled by said summing means output and supplying varying controlled amounts of uni-directional energy to said field circuit.

15. The system of claim 14, and including second summing means operatively coupled to phase means and receiving an alternating reference signal varying in response to said alternating source energy and to reference means and receiving a constant reference signal and operatively receiving said first summing means output and providing a second summing means output operatively controlling the operation of said gated rectifying means and selectively supply varying controlled amounts of uni-directional energy to said field circuit.

16. The system of claim 10, wherein said command means includes a command circuit supplying a constant first signal having said first polarity and said field sensing means includes a feedback circuit supplying said second signal having said second polarity to said summing means.

17. The system of claim 16, wherein said armature sensing means includes a connecting circuit supplying said third signal having said first polarity.

18. A transportation system having a guide path structure and a plurality of spaced landings and a transportation means comprising a transport vehicle, means mounting said vehicle for movement relative to said structure in a path extending adjacent each of said landings, motive means including a D.C. motor having a field circuit coupled to a first energy source means providing polyphase energy and an armature circuit coupled to a second energy source means, and control means connected to said second source means and controlling the amount of energy flowing between said second source means and said armature circuit, said control means including gated rectifying means connected to said first source means and to said field circuit and to gating control means, said gating control means including means providing a first signal commanding a first predetermined magnitude of field energization and means sensing the energy flowing between said first source means and said field circuit and providing a second signal varying according to the varying sensed field energy and means sensing the energy flowing between said second source means and said armature circuit and providing a third signal varying according to the varying sensed armature energy and phase means connected to said first source and providing an alternating reference signal varying in response to the varying sensed polyphase energy and summing means providing an output in response to said first, second, third and alternating reference signals and operatively controlling the operation of said gated rectifying means supplying varying controlled amounts of uni-directional energy to said field circuit.

19. The system of claim 18, wherein said gating control means includes disable means connected to said first source and providing a disable signal to said summing means and operatively preventing the conduction of energy to said field circuit by said gated rectifying means during a predetermined portion of each cycle of alternating energy.

20. A transportation system having a guide path structure and a plurality of spaced landings and transportation means comprising a transport vehicle, means mounting said vehicle for movement relative to said structure in a path extending adjacent each of said landings, motive means including a D.C. motor having a field circuit coupled to a source of polyphase energy and moving said vehicle relative to said structure, and control means controlling the amount of energy flowing between said source and said motive means including gated rectifying means connected to said source and to said field circuit and to gating control means, said gating control means including phase means providing an alternating reference signal varying in response to said varying source energy and reference means providing a constant reference signal and command means selectively providing a field energy command signal in response to commanded vehicle movement and output means operating in response to said alternating and constant reference signals and said command signal and operatively controlling the operation of said gated rectifying means and selectively supplying varying amounts of uni-directional energy to said field circuit, said gating control output means operating in response to said alternating and constant reference signals and the lack of said field energy command signal and operatively rendering said gated rectifying means condutive during a predetermined portion of each cycle of source energy and providng a predetermined amount of uni-directional energy to said field circuit.

* * * * *

UNITED STATES PATENT AND TRADEMARK OFFICE
CERTIFICATE OF CORRECTION

PATENT NO. : 3,938,624
DATED : February 17, 1976
INVENTOR(S) : John T. Maynard

It is certified that error appears in the above-identified patent and that said Letters Patent are hereby corrected as shown below:

| | |
|---|---|
| Column 3, Line 45, | Delete "disigned" and substitute therefor ---designed---; |
| Column 7, Line 40, | After "oppositely" insert ---oriented---; |
| Column 7, Line 46, | After "capacitor 54" insert ---and resistor 55---; |
| Column 7, Line 54, | Delete "32" and substitute therefor ---21---; |
| Column 10, Line 40, | Delete "pahse" and substitute therefor ---phase---; |
| Column 12, Line 39, | Delete "constsnt" and substitute therefor ---constant---; |
| Column 13, Line 11, | After "current" insert ---to the armature---; |
| Column 14, Line 19, | After "is" insert ---provided---; |
| Column 15, Line 7, | Delete "comprises" and substitute therefor ---comprising---; |
| Column 16, Line 25, | Delete "saaid" and substitute therefor ---said---. |

Signed and Sealed this
fifteenth Day of June 1976

[SEAL]

Attest:

RUTH C. MASON
Attesting Officer

C. MARSHALL DANN
Commissioner of Patents and Trademarks